United States Patent [19]

Lasher et al.

[11] Patent Number: 4,486,785

[45] Date of Patent: Dec. 4, 1984

[54] ENHANCEMENT OF VIDEO IMAGES BY SELECTIVE INTRODUCTION OF GRAY-SCALE PELS

[75] Inventors: Dana A. Lasher, Raleigh; William K. Stelzenmuller, Morrisville, both of N.C.

[73] Assignee: International Business Machines Corporation, Armonk, N.Y.

[21] Appl. No.: 429,382

[22] Filed: Sep. 30, 1982

[51] Int. Cl.$^3$ .............................................. H04N 1/40
[52] U.S. Cl. .................................. 358/284; 340/728; 340/793
[58] Field of Search ................ 358/284; 340/703, 727, 340/728, 793, 731; 179/15; 315/283

[56] References Cited

U.S. PATENT DOCUMENTS

| | | | |
|---|---|---|---|
| 4,119,956 | 10/1978 | Murray | 315/383 |
| 4,208,719 | 6/1980 | Lotz | 340/728 |
| 4,237,457 | 12/1980 | Houldsworth | 340/793 |
| 4,241,340 | 12/1980 | Raney | 340/731 |
| 4,354,186 | 10/1982 | Groothuis | 340/703 |

Primary Examiner—Howard W. Britton
Attorney, Agent, or Firm—Gerald R. Woods

[57] ABSTRACT

A technique for enhancing a displayed image originally stored at a density of 1 data bit per pel. The stored data is scanned to locate unit steps, one-row or one-column steps in binary values. Whenever a unit step is found, the distance from the step to the nearest transitions on both sides of the step are found. The distances are used to access lookup tables which assign 4 bit gray scale values to limited numbers of pels on both sides of the unit step. The assigned gray scale values produce a gradually-darkening string of pels extending through the step. When the entire image field has been scanned, a maximum 4 bit pel value is assigned to any unmodified pel having an original binary value of 1 and a minimum pel value is assigned to any unmodified pel having an original binary value of 0. The visual quality of the displayed image is enhanced by the selective introduction of intermediate gray scale values for pels adjacent unit steps.

8 Claims, 23 Drawing Figures

| J-1, I-1 | J-1, I | J-1, I+1 | J-1, I+2 |
| J, I-1 | J, I | J, I+1 | J, I+2 |
| J+1, I-1 | J+1, I | J+1, I+1 | J+1, I+2 |

TYPE 1 STEP    TEST: $\left.\begin{array}{l} PEL(J,I,) = PEL(J-1, I+1) \\ PEL(J+1, I) = PEL(J, I+1) \end{array}\right\}$ AND

FIG. 7

TYPE 2 STEP    TEST: $\left.\begin{array}{l} PEL(J,I) = PEL(J+1, I+1) \\ PEL(J-1, I) = PEL(J, I+1) \end{array}\right\}$ AND

FIG. 8

TYPE 3 STEP    TEST: $\left.\begin{array}{l} PEL(J,I) = PEL(J-1, I+1) \\ PEL(J, I+1) = PEL(J-1, I+2) \end{array}\right\}$ AND

FIG. 9

TYPE 4 STEP    TEST: $\left.\begin{array}{l} PEL(J-1, I-1) = PEL(J, I) \\ PEL(J-1, I) = PEL(J, I+1) \end{array}\right\}$ AND

ENHANCEMENT OF VIDEO IMAGES BY SELECTIVE INTRODUCTION OF GRAY-SCALE PELS

BACKGROUND

The present invention relates to telecommunications and more particularly to a method and means for enhancing a non-coded video image based on one bit/pel data through the selective introduction of gray-scale pels prior to presentation on a gray scale display device.

Because of rising travel costs, there is an increasing interest in the use of teleconferencing systems for the conduct of business meetings. In a typical teleconferencing system, people in different cities or even different countries meet in special teleconferencing rooms. Each room normally includes a room camera for capturing a wide angle view of the people, a document camera which can be focussed on letters, drawings or other documents, a room monitor for permitting people in one room to see those in the other, and a document monitor for viewing documents being presented in the other room. Communications between the two rooms are established over conventional teleprocessing links, such as leased or switched telephone lines or satellite communication channels.

To reduce communications costs, freeze-frame teleconferencing systems are employed. In such systems, the video image captured by a room camera is updated only periodically, perhaps on the order of once every 30 seconds. People at the receiver will see the same "frozen" room image for 30 seconds between updates. Audio signals are transmitted on a "real time" basis so that there is no significant delay in voice communications. Document images are updated only when the person presenting a document pushes a "send" button in the teleconferencing room.

After a "send" button is pushed, the image of the presented document will not appear immediately on a display or monitor in the receiving teleconferencing room. A finite period of time is required to capture and process image data at the originating teleconferencing room, to transmit the processed data over teleprocessing links and to process data at the receiving teleconferencing room in order to reconstruct the image of the presented document. The length of the delay can be critical in a teleconferencing system. Delays exceeding a few seconds will produce unnatural pauses in the smooth flow of a business meeting.

The length of the delay is generally proportional to the amount of data which must be transmitted in order to construct an acceptable video image and is inversely proportional to the bandwidth of the teleprocessing link over which the data must be transmitted. While the amount of delay can be reduced by using a higher bandwidth channel, the drawback to this approach is that communications cost are a function of required bandwidth. Therefore, it is desirable to use as little bandwidth as possible.

Attempts have been made to minimize delay time and to maintain low communication costs by compressing the amount of data which must be transmitted over a low bandwidth channel in order to reconstruct a video image of a presented document. For example, documents which are normally bilevel (i.e., black printing on white paper) can be digitized by assigning a binary value to each sampled picture element (pel). Thus, each pel would represent either black or white. When formatted in a two-dimensional array, the data would represent the captured image. For typical business documents, encoding this data using a two-dimensional run length encoding technique will significantly reduce the amount of data required for transmission.

However, bi-level sampling may distort an image in several ways. One very noticeable distortion is the creation of a stair-step appearance along non-vertical and non-horizontal lines. As the sampling resolution is decreased, so as to decrease the captured image data and improve the transmission delay, the steps or jagged edges become larger and increasingly displeasing to the viewer. For typical business documents, however, the image remains readable long after the decreased sampling resolution has produced very displeasing visual distortions. Therefore, an effective system approach is to sample, compress, and transmit low resolution bi-level data to attain high speed and low transmission costs, and to then operate on the received data after transmission to enhance the visual appearance of the image.

There are known techniques for reducing the visual impact of jagged or stepped edges.

One technique for smoothing stepped edges has been to pass a raster control signal for the receiving monitor through a low pass filter. The low pass filter removes the high frequency components from the signal, thus rounding out the corners and decreasing its rise and fall times. Unfortunately, the absence of high frequencies will cause the entire character (and not just stepped edges) to be blurred as if the receiving monitor were slightly out of focus.

Another technique for smoothing stepped edges uses delay apparatus for storing digitally generated raster control signals. Stored raster control signals are combined with more recent raster control signals in an analog fashion in order to generate a composite or interpolated raster control signal. The interpolated raster control signal is resolved in horizontal time increments of finer resolution than could be obtained from the original raster control signal. Raster control signals of several horizontal scan lines are also compared in order to detect the slope of the edges of a character to be displayed. A rise-control signal is generated to control the rise and fall times of the interpolated raster control signal in proportion to the detected slope.

SUMMARY OF THE INVENTION

The present invention is a method for reducing the visual impact of stepped edges by the selective introduction of gray-scale pels before the image is displayed. A system in which the present invention may be practiced must be capable of receiving and storing non-coded binary image pel data. The stored data is examined on a pel by pel basis along successive pel lines to identify unit steps in binary pel values in a direction transverse to the direction of the successive lines. The stored data is modified by assigning gray scale values to a limited number of pels on opposite sides of each identified unit step to create a string of gradually changing gray scale pel values extending through each identified unit step. Fixed gray scale values are assigned to any pels not previously modified to establish upper and lower limits on gray scale pel values. The displayed image is generated in accordance with the assigned gray scale pel values. The selective introduction of gray scale pels at the identified unit steps has the effect of smoothing the image in the area of the unit steps without blurring the remainder of the character.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings, wherein:

SPECIFICATION

Figure 1:
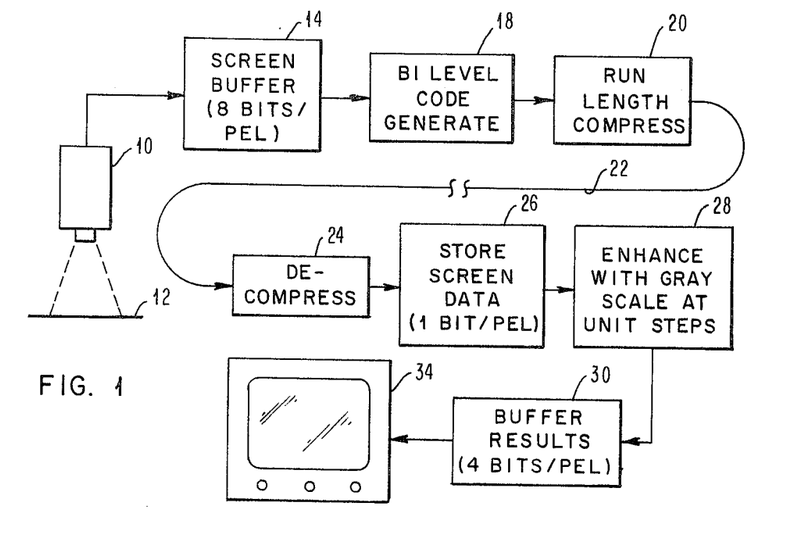
FIG. 1 is a block diagram of a system within which the present invention may be practiced.

Turning now to FIG. 1, a typical teleconferencing installation includes a document camera 10 for scanning a business document placed on a horizontal surface 12. The camera 10 may be a conventional raster scan television camera capable of capturing the document image at a gray scale resolution of 8 bits per pel. That is, the camera may be able to discriminate among 256 levels of gray ranging from 0 , (pure white) to 255 (pure black). A digital value for each pel in a full screen in a full screen image or image field may be stored in a buffer memory 14. In one embodiment, the captured data may be simplified or converted from 8 bits per pel to a bilevel form in a unit 18, meaning that each pel is defined by a binary 0 or binary 1. The bilevel code is compressed (unit 20) using conventional one-dimensional or two-dimensional run length compression techniques before being transmitted over a teleprocessing link 22 to a remote teleconferencing installation.

At the remote installation, the compressed data is decompressed (unit 24) and the decompressed data for the entire image field is stored at a density of one bit per pel (unit 26). The stored data is scanned along successive pel rows to locate image-distorting unit steps, a term which is defined in more detail later. The received data is enhanced from one bit per pel to some greater number of bits (e.g., four) per pel by modifying the gray scale value of pels adjacent unit steps to intermediate gray scale values. The objective of the enhancement is to create a string of pels having gradually changing gray scale values. The string extends through the unit step to make the image more visually palatable to a viewer. The results of the decompression enhancement performed in unit 28 are stored in a buffer memory (unit 30) at a preferred pel density of 4 bits per pel. In the buffer memory, the pel values may range from 0 (pure white) to 15 (pure black) with intermediate values being assigned as a result of the operations performed in unit 28. The pel data stored in buffer 30 is used to generate a video image stored on display monitor 34.

The present invention relates strictly to the operations performed in unit 28; that is, the enhancement of bilevel data through the process of identifying unit steps and selectively assigned gray scale values to pels adjacent identified unit steps. The starting point for the remainder of this description is the bilevel data presented at the output of unit 26. The finishing point is the data presented to buffer unit 30 at a gray scale resolution of 4 bits per pel.

The components shown in block format in the figure are described for the most part as "units," which is a term which is intended to cover both hardware and software for accomplishing the described function. Preferably, the operations of converting, compressing, decompressing and enhancing data are carried out by programs executed within a suitable general purpose processor. Necessary data storage would occur in memory units coupled to the processor.

Figure 2:
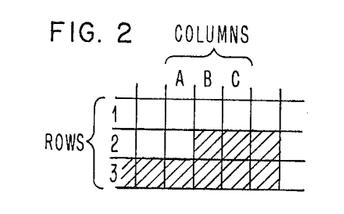
FIGS. 2 and 3 depict pel arrays showing vertical and horizontal unit steps.
Figure 3:
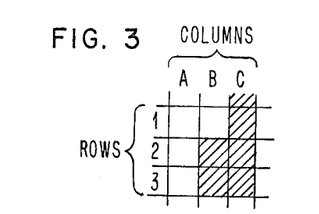

Throughout the description, reference is made to unit steps in pel values. FIG. 2 illustrates one type of vertical unit step. A vertical unit step is one in which a step or change in pel values extends across a single row of pels. More specifically, the binary "1" pel values (indicated by cross-hatching) step up one row from the pel at row 3, column A to the pel at row 2, column B. FIG. 3 illustrates a horizontal unit step. The binary "1" pel values take a column step to the right from the pel at row 2, column B to the pel at row 1, column C.

In the captured bi-level data, most units steps are distortions which are a consequence of the sampling process used to digitize the bi-level image. Smooth lines in the original image will contain numerous vertical and horizontal steps after sampling. Some of these steps may have been in the original image, but many new steps will have been introduced by the sampling. The steps introduced by sampling will always have the characteristic that either the horizontal or vertical length or both the horizontal and vertical length of the step will be exactly one pel, hence, the name "unit step". If the assumption is made that all unit steps are introduced by sampling and that all other steps are part of the original image, a technique is available for identifying the sampling induced steps. The technique is subject to the error that unit steps present in the original image will be treated incorrectly as sampling-induced distortions. However, this error is relatively small for typical business documents.

Figure 4:
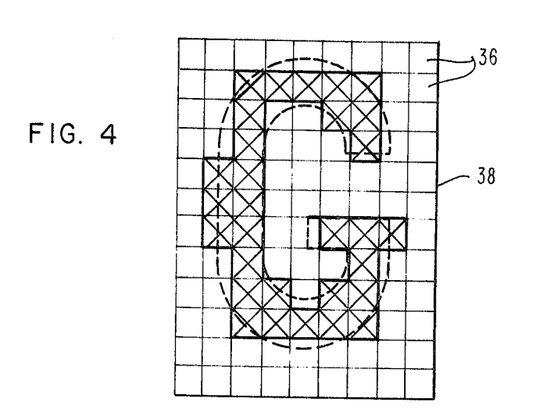
FIG. 4 depicts a letter G and the distorted character which results when that letter is scanned and the resulting data is reduced to bilevel (1 bit/pel) form.

Referring to FIG. 4, a conventional "G" character having rounded contours is illustrated both in its original form and in a bilevel (1 bit/pel) form produced after the character is scanned by a camera having a pel resolution defined by the small squares 36 within the overall array 38. Although the original value of each pel might be defined by 8 data bits, when the data is reduced to bilevel form, each pel will be defined by a single bit. For simplicity in illustration, assume each pel will have a 0 (or white) value if less than 50% of the pel area is covered by the character and the binary value of 1 (or black) if 50% or more of the pel area is covered by the character.

The result is highly distorted, boxy character which, if displayed as is, would be intelligible but visually jarring. The present invention is a technique for operating on the bilevel data so as to selectively insert gray scale values which will cause the characters to take on a more rounded and more visually pleasing appearance.

Figure 21:
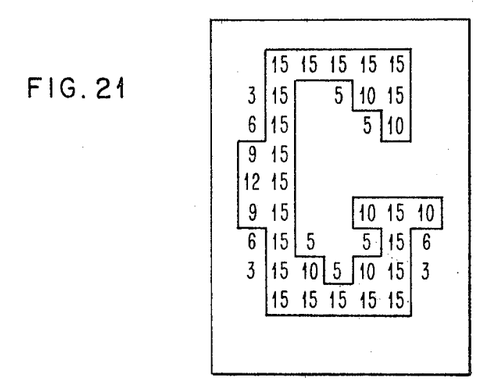
FIG. 21 depicts the distorted bilevel "G" character with pel values modified in accordance with the present invention to reduce the visual impact of the distortion.
Figure 22:
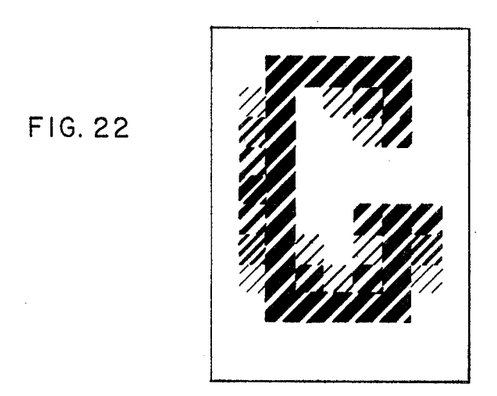
FIG. 22 is an attempt to depict the actual appearance of the "G" character when the pel values have been modified in accordance with the present invention.

FIGS. 21 and 22 illustrate the assignment of gray scale values and the actual character appearance which might result from assignment of those values. These figures will be discussed in more detail later.

Figure 5:
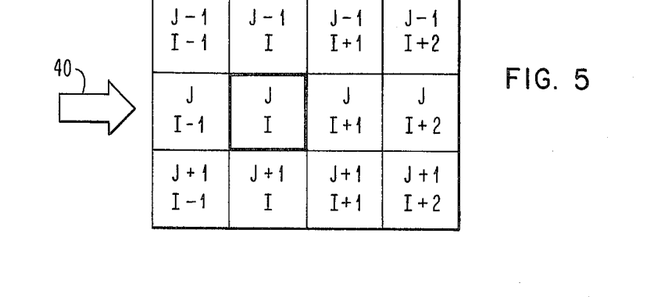
FIG. 5 is a matrix defining pel locations relative to a "base" pel located at row J, column I.

Referring now to FIG. 5, a method incorporating the present invention is implemented at the receiving teleconferencing site and requires that each logical row of stored bilevel image data be scanned on a pel by pel basis. The terms "logical row" and "logical column" are used from time to time in this description. The terms imply that image data are stored in memory locations which logically represent row and column coordinates of pels in an image field, notwithstanding the actual memory locations may not be arrayed in a row/column matrix. At any given instant of time during memory scanning, only the binary values of those pels within a three by four logical matrix must be taken into consideration. Assuming the stored data is being scanned from left to right along pel row J as indicated by arrow 40, a "base" pel is defined as the pel at the intersection of row J and column I. All other pels in the three by four matrix are defined relative to the base pel. For example, the pel immediately below the base pel is defined as pel (J+1,I).

As the stored binary data is scanned on a pel by pel basis, a simple inequality test is perfomed to locate the presence of pel transitions which are a prerequisite for unit steps. The binary value of each pel (J,I) is compared with the binary value of the adjacent pel (J,I+1). If the compared pels have the same value, no test for unit steps are performed. Scanning continues with the next pel in the row. However, if successive pels have unequal values, indicating a black-to-white or white-to-black transition, tests are performed for vertical unit steps, which may be classified either as type 1 or type 2 steps.

Figure 6:
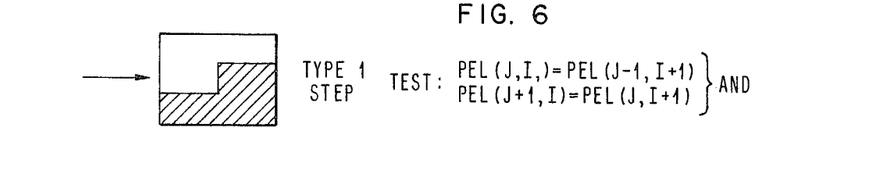
FIGS. 6 through 9 define tests for the four possible types of unit steps in terms of the pel location definitions of FIG. 5.

FIG. 6 illustrates a type 1 step, which can be generally defined as an upwardly-extending unit change or step in pel values spanning a single row. The test for a type 1 step is expressed in FIG. 6.

Figure 7:
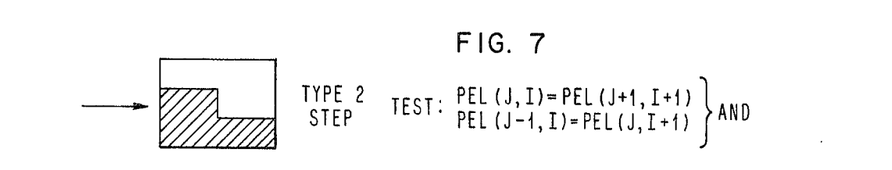

A vertical unit step may also take the form of a type 2 step, illustrated in FIG. 7. A type 2 step is a downwardly-extending unit change or step in pel values spanning a single row. FIG. 7 also includes the test for a type 2 step.

Figure 8:
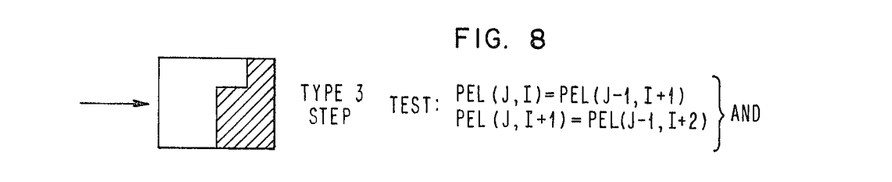
Figure 9:
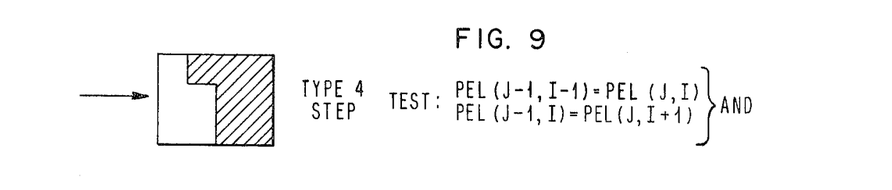

In one embodiment of the invention, tests are performed for horizontal unit steps only when a vertical unit step (either type 1 or type 2) has been found since any vertical unit step will necessarily include a horizontal step of some kind. There are two types of horizontal unit steps. FIG. 8 illustrates a type 3 step which may be defined as a rightwardly-extending one column change in pel values. The test for a type 3 step is also stated in FIG. 8. The second kind of horizontal unit step is a type 4 step which may be defined as a leftwardly-extending single column change in pel values. The test for a type 4 step is stated in FIG. 9.

Figure 10:
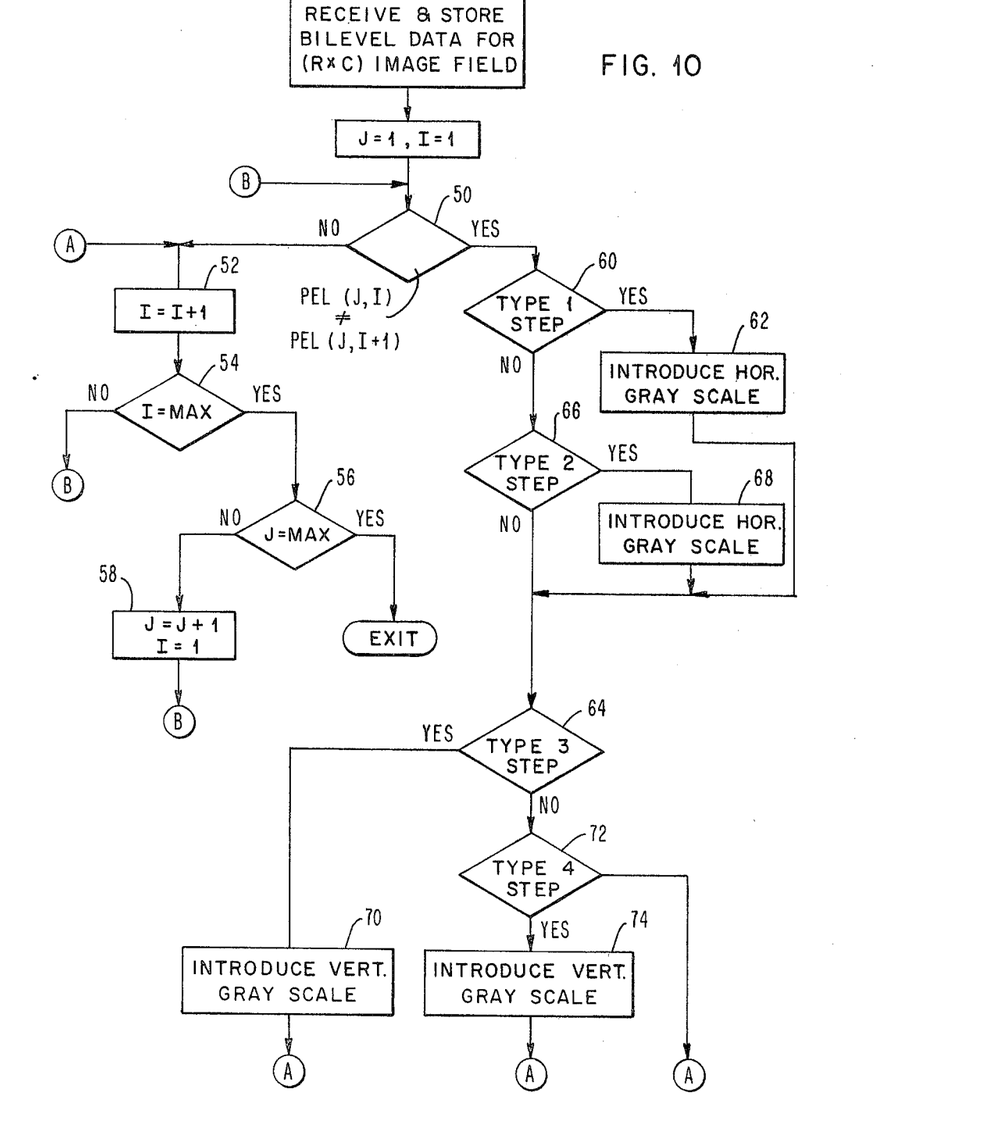
FIG. 10 is a generalized flow chart of a method incorporating the present invention.

FIG. 10 is a simplified flow chart of steps that are performed in a method incorporating the present invention. Initially, it is assumed that bilevel data for an image field having R rows and C columns has been received and stored at the density of one bit per pel. The gray scale enhancement process begins with pel (1,1) located at the upper left corner of the area to be displayed. The binary value of pel (1,1) is compared (block 50) to the binary value of the adjacent pel in the same row. If the compared pels have the same binary value, the column number for the pels being examined is incremented (block 52) and a check is made (block 54) as to whether the last column in the row has been reached. If the last column has not been reached, operation 50 is repeated for the next pair of adjacent pels in the same row.

Assuming that no inequalities are found (that is, that all the pels in the row have the same binary value) the loop consisting of operations 50, 52 and 54 will be repeated until operation 54 indicates that the last column to be examined has been reached. At this point a check (block 56) is made to determine whether the last row to be examined has also been reached. If it has not, the row value is incremented and the column value is reset to one (block 58). The pel-by-pel examination of adjacent pairs of pels continues in the next row.

If the stored data represents a document, operation 50 will at some point in the pel-by-pel examination reveal an inequality between binary values of adjacent pel values. When an inequality is found, a check is made for the presence of a type 1 step (block 60) using the equations set forth in FIG. 6. If a type 1 step is found, a limited number of pels on either side of the identified type 1 step are modified. Generally speaking, if the binary value changes from 0 to 1 at the identified unit step, a limited number of pel values will be modified to provide increasing gray scale levels beginning at some distance to the left of the unit step and extending through the unit step. The details of a preferred technique for introducing gray scale will be described with reference to later figures.

If a type 1 step is found, an immediate test (block 64) is begun for the presence of a type 3 step. However, if no type 1 step was found in block 60, then a test for a type 2 step (block 66) is made for the presence of a step using the equation set forth in FIG. 7. Gray scale pel values are introduced along the row or horizontally (block 68) if a type 2 step is found.

Regardless of whether a type 1 or type 2 step is found, a check (block 64) is always made for the presence of a type 3 step when the binary value of an examined pel is found not to be equal to the binary value of the next pel in the same row. The test for a type 3 step is set forth in the equations in FIG. 8. If a type 3 step is found, a limited number of pels above and below the step are modified (block 70) to provide gradually changing pel values beginning on one side of the step and extending through the step. If a type 3 step is found, the program is continued at the input to block 52. If a type 3 step is not found, a test is made (block 72) for the presence of a type 4 step using the equations set forth in FIG. 9. If a type 4 step is found, a limited number of pels in the column indicating the step are modified (block 74) in a manner described in more detail later.

The process of testing for various types of steps and of modifying pels on either side of the steps is repeated for each adjacent pair of pels in each row of the image field. When this process has been completed, any pel which has not been modified may be assigned a value of 0 (white) or 15 (black). The assigned pel values, by which gray scale is defined by 4 bits per pel, are of course stored in an image field buffer as represented by unit 30 in FIG. 1.

Figure 11:
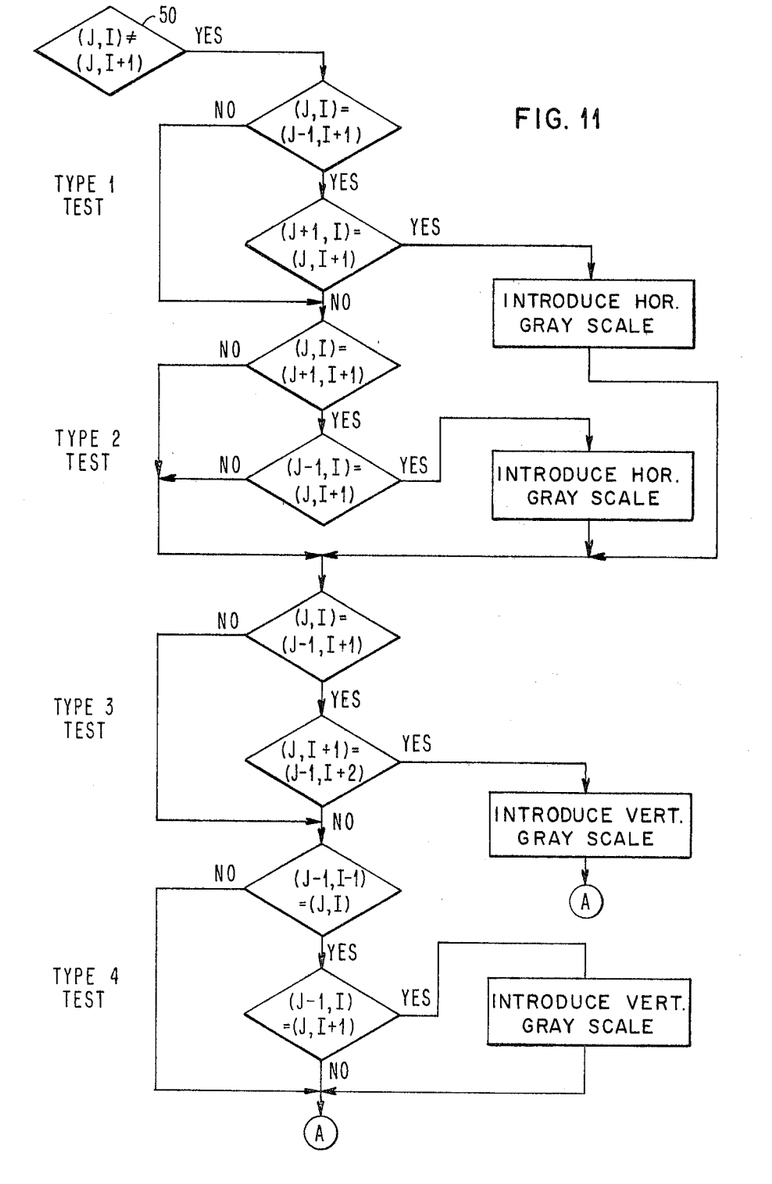
FIG. 11 is a more detailed flow chart of tests for unit steps which are made in carrying out this method.

FIG. 11 is a more detailed flow chart of the actual tests that are made to determine whether type 1, type 2, type 3 and/or type 4 unit steps exist. The decision blocks represent the decisions which must be made to determine whether any of the steps has been found.

Figure 12A:
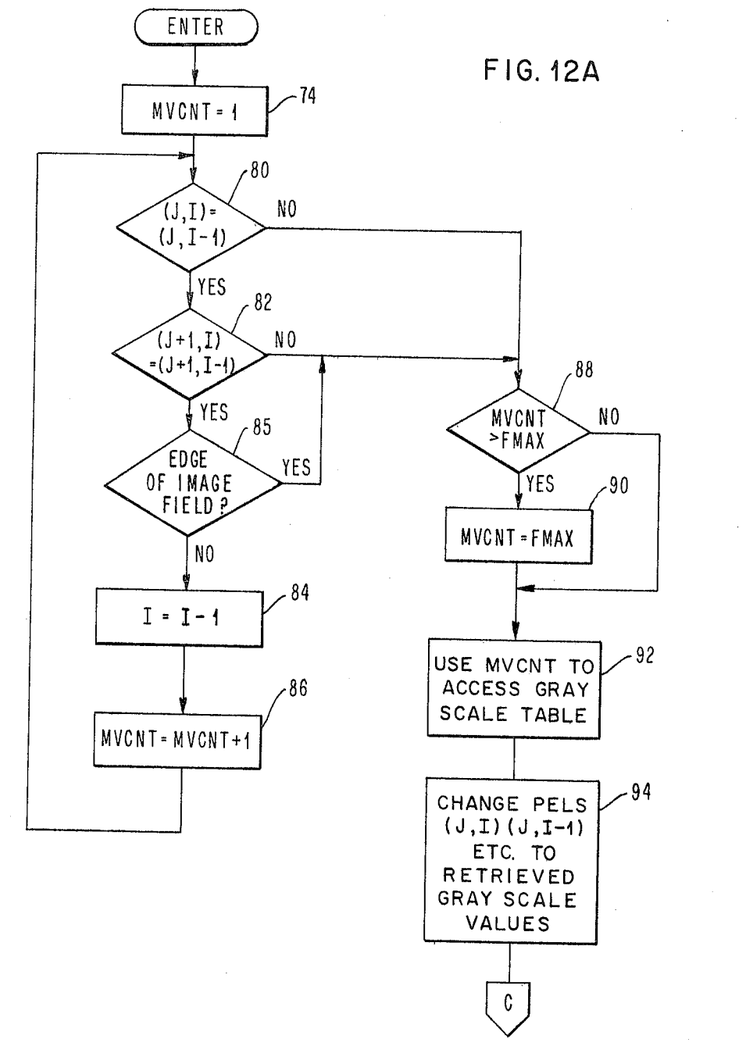
FIGS. 12A and 12B, taken together, are detailed flow charts of steps performed in determining the number of pels to be modified under different conditions when a unit step is located.
Figure 12B:
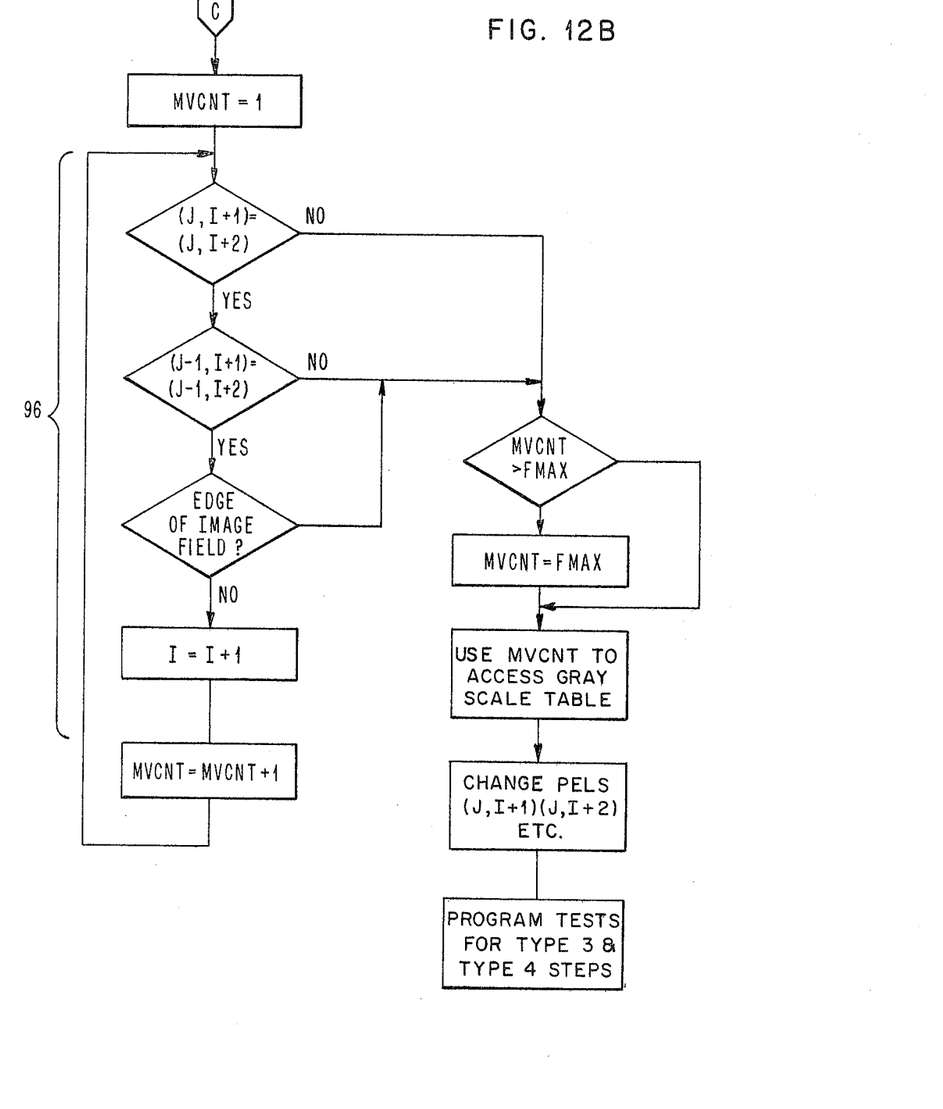
Figure 13:
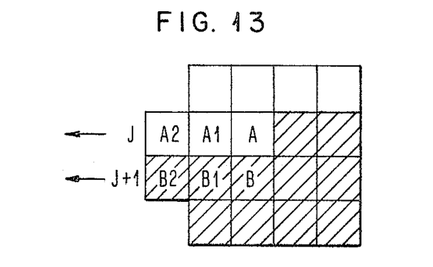
FIG. 13 shows the sequence in which pels are compared during the steps defined by FIGS. 12A and 12B.

Assuming that a unit step has been found, the number of pels which are modified by assigning gray scale values and the actual gray scale values to be assigned are determined by a process defined by FIGS. 12A and 12B, taken together. The process differs slightly with each different type of unit step. The process will be described in detail assuming that a type 1 unit step has been found. The differences between the described process and the process needed for type 2, type 3 or type 4 steps will then be described. If a type 1 steps is found (block 60 in FIG. 10) a variable MVCNT is set to 1. This variable will ultimately represent the distance between the vertical edge of the unit step and the next vertical transition to the left of the unit step either in the row containing the unit step or in the following row. After MVCNT is initialized, a decision (block 80) is made whether the pel (J,I) has the same binary value as the pel (J,I−1). These pels are identified in FIG. 13 as pels A and A1, respectively. If the pels at locations A and A1 are found to be equal, a check is then made (block 82) as to whether the pels at locations B and B1 are equal to one another. If they are, the column location is decremented by 1 (block 84) and MVCNT is incremented by 1 (block 86) and the comparison process is repeated. This time, the binary value of the pel at A1 is compared to the value at A2 and the binary value of the pel at B1 is compared to the value at B2. When either of the comparisons performed in blocks 80 and 82 is negative, indicating that another vertical transition has occurred either in row J or J+1, a check (block 88) is made to determine whether the current value of MVCNT is greater than an empirically selected value Fmax. If MVCNT exceeds the maximum, it is set at the maximum in an operation 90. The actual or assigned value of MVCNT is used to access gray-scale table I or II set forth below depending on whether the pels to the left of the type 1 step in row J have a 0 (white) or 1 (black) value. The number of pels to be modified to the left of the unit step and the values to be assigned to those pels is determined from the table. For example, if six pels were found to exist between the identified type 1 step and the next vertical transition to the left of the step in either row J or row J+1, only three pels to the left of the step would be modified. Assuming the pels to the left of the step have a binary value of 0 (white) the pel closest to the step would be assigned a gray scale value of 6. The next closest pel would have a gray scale value of 4 while the third pel would be assigned a gray scale value of 2. Thus, the gray scale values would begin from a minimum value of 0 four pels to the left of the unit step and would increase gradually to a maximum value of 6 adjacent to unit step. This would provide a gradually darkening area which would "smooth out" the abrupt transition which would otherwise appear at the unit step.

TABLE I

GRAY SCALE VALUES (BLACK SIDE OF EDGE)

| MVCNT | PEL LOCATION (Relative to Edge) | | | | | | | | |
|---|---|---|---|---|---|---|---|---|---|
| | 1 | 2 | 3 | 4 | 5 | 6 | 7 | 8 | 9 |
| 1–2 | 10 | | | | | | | | |
| 3–4 | 9 | 12 | | | | | | | |
| 5–8 | 9 | 11 | 13 | | | | | | |
| 9–10 | 8 | 10 | 11 | 13 | 14 | | | | |
| 11–17 | 8 | 9 | 10 | 11 | 12 | 13 | | | |
| 18 | 8 | 9 | 10 | 10 | 11 | 12 | 13 | 13 | 14 |

TABLE II

GRAY SCALE VALUES (WHITE SIDE OF EDGE)

| MVCNT | PEL LOCATION (Relative to Edge) | | | | | | | | |
|---|---|---|---|---|---|---|---|---|---|
| | 1 | 2 | 3 | 4 | 5 | 6 | 7 | 8 | 9 |
| 1–2 | 5 | | | | | | | | |
| 3–4 | 6 | 3 | | | | | | | |
| 5–8 | 6 | 4 | 2 | | | | | | |
| 9–10 | 7 | 6 | 5 | 3 | 2 | | | | |
| 11–17 | 7 | 6 | 5 | 4 | 3 | 2 | | | |
| 18 | 7 | 6 | 6 | 5 | 4 | 3 | 3 | 2 | 1 |

Figure 14:
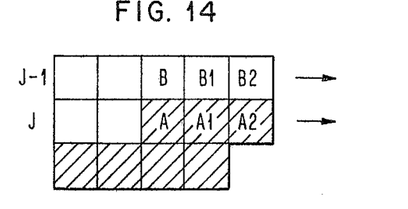
FIGS. 14 through 20 show the sequence in which pels are compared for various kinds of unit steps when processes similar to that set forth in FIGS. 12A and 12B are carried out after finding those kinds of unit steps.

When pel values have been assigned for pels to the left of the unit step, the same type of process takes place for pels to the right of the unit step. This process is described in the flow chart appearing in FIG. 12B. Referring momentarily to FIG. 14, the pels which are compared in this process are those in rows J and J−1. If the binary value of each pel in one of these rows is found to be equal to the binary value of the next pel in the same row, the process defined by loop 92 continues. When, however, a pel in row J−1 or a pel in row J is found not to be equal to the next pel, indicating that another vertical transition has occurred in one of those rows, the pel distance MVCNT between the unit step and the next vertical transition to the right is used to access either table I or table II to determine the appropriate gray scale pel values to the right of the unit step. Assuming as an example that the variable MVCNT is found to be equal to 3, indicating three pels exist between the unit step and the next vertical transition in row J or row J−1 to the right of the step, the gray scale values assigned to two of those pels would be modified. The pel closest to the unit step would be assigned a gray scale value of 9 while the next pel would be assigned a gray scale value of 12.

Thus, for the arbitrarily assumed values, three pels to the left of the unit step would be modified and two pels to the right of the unit step would be modified. The assigned gray scale values would be, from left to right, 2, 4, 6, 9 and 12.

Figure 15:
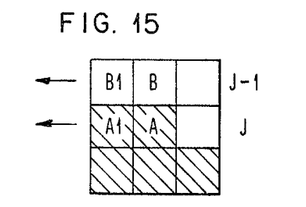
Figure 16:
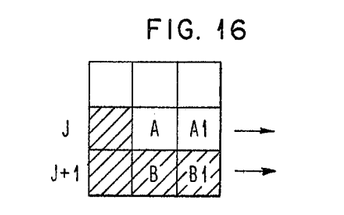
Figure 17:
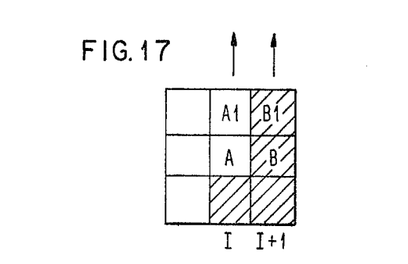
Figure 18:
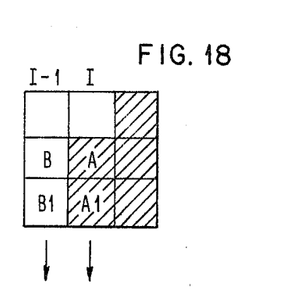

The same two tables are used to determine the assigned gray scale values for type 2, type 3, and type 4 steps. The pels which are compared in order to determine the appropriate values for the MVCNT value are defined by FIGS. 15 through 20. For a type 2 step, adjacent pels in rows J and J−1 are compared to the left of the unit step as shown in FIG. 15. To the right of a type 2 unit step, successive pels in rows J and J+1 are compared to establish the value of MVCNT. Where a type 3 step is identified, adjacent pels in the same column are compared. FIG. 17 shows the pels that are compared in columns I and I+1 to determine MVCNT above an identified unit step. FIG. 18 shows the pels in columns I and I−1 which are compared to determine MVCNT below an identified unit step.

Figure 19:
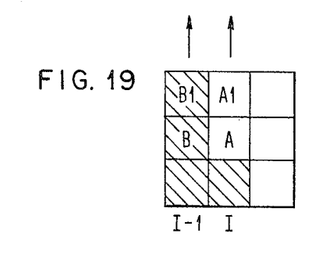
Figure 20:
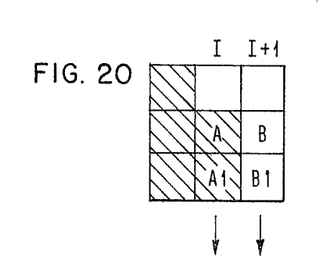

The same type of comparison is made for a type 4 unit step. Above the step, successive pels in columns I−1 and I are compared as shown in FIG. 19. Below the step, successive pels in columns I and I+1 are compared as shown in FIG. 20.

FIG. 21 shows the "G" character outlined as it would appear if encoded at one bit per pel. The gray scale values resulting from application of the technique described above are shown in each pel. Where no value has been assigned to a pel, it can be assumed that the gray scale value would be 0 or white. It can be perceived either from FIG. 21 or FIG. 22 that the assignment of gray scale pel values at the unit steps has the effect of smoothing what would otherwise be rectangular contours of the character. The smoothing has the effect of making the character more visually palatable to an observer.

It should be understood that the technique described in detail does not serve the purpose of reconstructing the exact image originally scanned by the document camera. The technique operates on the available binary data to construct an image which, while not necessarily a duplicate of the original image, is considered to be more visually palatable to a viewer.

While there has been described what is considered to be a preferred embodiment of the present invention, variations and modifications therein will occur to those skilled in the art once they become acquainted with the basic concepts of the invention. For example, while the preferred technique tests for the presence of both vertical and horizontal unit steps each time an inequality is found and assigns gray scale pel values for each identified type of unit step before proceeding to examination of the next pair of pels, it is well within the scope of the present invention to scan all stored data testing only for vertical unit steps and then to rescan the entire field of stored data on a column by column basis looking only for horizontal unit steps.

Since these and other variations and modifications will be obvious to those skilled in the art, it is intended that the appended claims shall be construed to include not only the preferred embodiment but all such variations and modifications as fall within the true spirit and scope of the invention.

Having thus described our invention with reference to a preferred embodiment, what we desire to protect by Letters Patent is, we claim:

1. In a system for receiving and storing non-coded binary image pel data and for generating an image derived from the stored data on a gray scale display device, a method for enhancing the visual quality of the displayed image characterized by the steps of:
examining the stored data on a pel by pel basis along successive pel lines to identify unit steps in binary pel values in a direction transverse to the direction of the successive lines;
modifying the stored data by assigning gray scale values to a limited number of pels on opposite sides of each identified unit step to create a string of gradually changing pel values extending through each identified unit step;
assigning fixed gray scale values to any pels not already modified to establish upper and lower limits on gray scale pel values; and
generating the displayed image in accordance with the assigned gray scale pel values.

2. A method as defined by claim 1 wherein binary image pel data is stored in a memory array defined by logical rows and columns corresponding to the row and column display locations of the gray scale display device and wherein substantially all stored data is examined on a pel by pel basis along successive rows to locate unit steps spanning a single row.

3. A method as defined by either of claims 1 or 2 wherein the step of modifying the stored data is further characterized by the steps of:
examining stored data in opposite directions beginning with the pels adjacent each identified unit step to locate either the display boundary or the nearest pel in either the step-containing line or an adjacent line at which a change in binary pel values occurs; and
assigning gray scale pel values to a predetermined maximum number of pels bounded by the starting pel and the located pel.

4. In a system for receiving and storing binary data representative of pels in a previously captured image wherein the binary data is stored in a memory array, arranged in logical rows and logical columns, at a density of one bit per pel, a method of assigning gray scale values to certain pels to enhance the visual quality of the image when displayed on a gray scale display device, said method characterized by the steps of:
examining the stored binary data on a pel by pel basis along successive pel lines to identify unit steps in binary pel values in a direction transverse to the direction of the successive lines, each identified unit step being adjacent a pel arbitrarily defined as occurring at an intersection of row J and column I in a display area;
examining the binary data beginning at column I+1 and continuing to the right until a display boundary is encountered or a change in binary data is found in row J or in one of rows J−1 and J+1 to derive a pel distance RD;
examining the binary data beginning at column I and continuing to the left until a display boundary is encountered or a change in binary data is found in row J or one of rows J−1 and J+1 to derive a pel distance LD;
modifying the stored data representing pels to the right of the unit step by assigning gray scale values as a function of the derived distance RD;
modifying the stored data representing pels to the right of the unit step by assigning gray scale values as a function of the derived distance RD;
modifying the stored data representing pels to the left of the unit step by assigning gray scale values as a function of the derived distance LD;
assigning fixed gray scale values to any pels remaining unchanged following the modifying steps to fix upper and lower limits on gray scale pel values; and
generating the displayed image in accordance with the assigned gray scale pel values.

5. A method as defined in claim 4 further characterized by the steps of:
examining binary data in a region encompassing an identifying inter-row unit step to determine whether the region also includes a second unit step extending one column from the boundary of columns I and I+1;
examining the binary data beginning with the pel at the row and column immediately above the second unit step and continuing upwardly until a display boundary is encountered or a change in data is found in column I or one of columns I−1 and I+1 to derive a pel distance UD;

examining the binary data beginning with the pel at the row and column immediately below the second unit step and continuing downwardly until a display boundary is encountered or a change in binary data is found in column I or one of columns I−1 and I+1 to derive a pel distance DD;

modifying the stored data representing pels above the second unit step by assigning gray scale values as a function of the derived distance UD; and modifying the stored data representing pels below the second unit step by assigning gray scale values as a function of the derived distance DD.

6. A method as defined in claim 5 wherein the number of pels which are modified as the result of finding a unit step are limited to a predetermined maximum value regardless of the actual magnitude of the derived distance.

7. A method as defined in claim 5 wherein the assigned gray scale values are derived in a table lookup step wherein the values are stored in arrays defined by the original binary value of the pels being modified, the number of pels to be modified and the location of each of those pels relative to the identified unit step.

8. A system for enhancing the visual quality of a gray scale image produced by a gray scale display device where the image is derived from data stored at a density of one bit per pel, said system including:

means for examining the stored data to locate unit steps in binary pel values;

means for assigning gray scale values to pels on opposite sides of each unit step to create a string of gradually changing pel values extending through each identified unit step;

means for assigning fixed gray scale values to any pels not already modified to establish limiting black/white pel values; and means for generating the displayed image in accordance with the assigned gray scale pel values.

* * * * *